(12) United States Patent
Gibb et al.

(10) Patent No.: US 8,079,129 B2
(45) Date of Patent: Dec. 20, 2011

(54) INSTALLATION-READY PIPE COUPLING METHOD OF MANUFACTURE

(75) Inventors: John Gibb, Ontario (CA); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 13/036,442

(22) Filed: Feb. 28, 2011

(65) Prior Publication Data

US 2011/0146048 A1 Jun. 23, 2011

Related U.S. Application Data

(62) Division of application No. 12/042,769, filed on Mar. 5, 2008.

(51) Int. Cl.
*B23P 11/00* (2006.01)
(52) U.S. Cl. ........................................ 29/525.01; 29/428
(58) Field of Classification Search ............... 29/525.01, 29/428
See application file for complete search history.

(56) References Cited

U.S. PATENT DOCUMENTS

| | | | |
|---|---|---|---|
| 2,752,173 A | 6/1956 | Krooss | |
| 4,377,894 A | 3/1983 | Yoshida | |
| 4,417,755 A | 11/1983 | Gittleman | |
| 4,522,434 A | 6/1985 | Webb | |
| 4,601,495 A | 7/1986 | Webb | |
| 5,230,537 A | 7/1993 | Newman | |
| 5,390,523 A * | 2/1995 | Corbett | 72/377 |
| 5,901,601 A | 5/1999 | Fujimoto et al. | |
| 6,619,094 B2 | 9/2003 | Juhl | |
| 7,086,131 B2 | 8/2006 | Gibb et al. | |
| 7,712,796 B2 * | 5/2010 | Gibb et al. | 285/411 |
| 2008/0007061 A1 | 1/2008 | Gibb et al. | |

FOREIGN PATENT DOCUMENTS

EP 0 178 360 A1 4/1986

OTHER PUBLICATIONS

Baharlou, Simin; PCT International Preliminary Report on Patentability; issued Sep. 16, 2010, pp. 1-9.
Copenheaver, Blaine R.; PCT International Search Report and Written Opinion; issued Apr. 24, 2009, pp. 1-9.
Dekker, Derk; Supplementary European Search Report and European Search Opinion from corresponding European patent application No. 09717361; pp. 1-4; Jun. 21, 2011.

* cited by examiner

*Primary Examiner* — Derris Banks
*Assistant Examiner* — Azm Parvez
(74) *Attorney, Agent, or Firm* — Ballard Spahr LLP

(57) ABSTRACT

A method of manufacturing an installation-ready pipe coupling is disclosed. The method includes providing pipe coupling segments each having an initial radius of curvature and an initial subtended angle. The segments are each deformed so as to take a permanent set and have a final radius of curvature greater than the initial radius of curvature and a final subtended angle smaller than the initial subtended angle. The deformed segments are assembled in end-to-end relation using adjustably tightenable fasteners to form a coupling. The deformed segments are maintained in spaced relation so that pipe elements can be inserted between them without disassembly of the coupling.

12 Claims, 10 Drawing Sheets

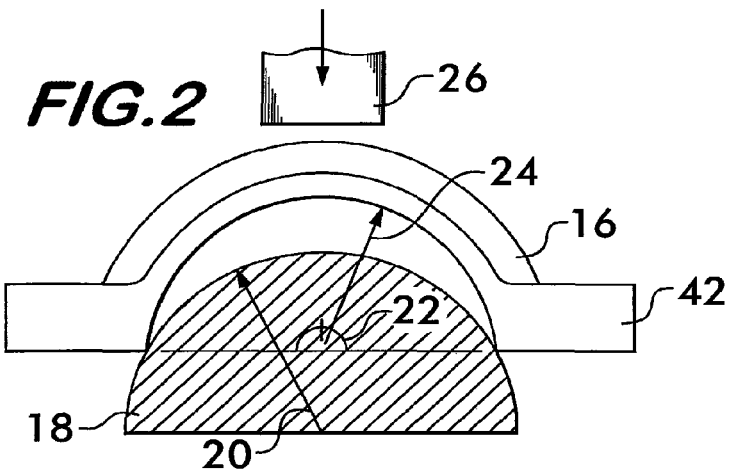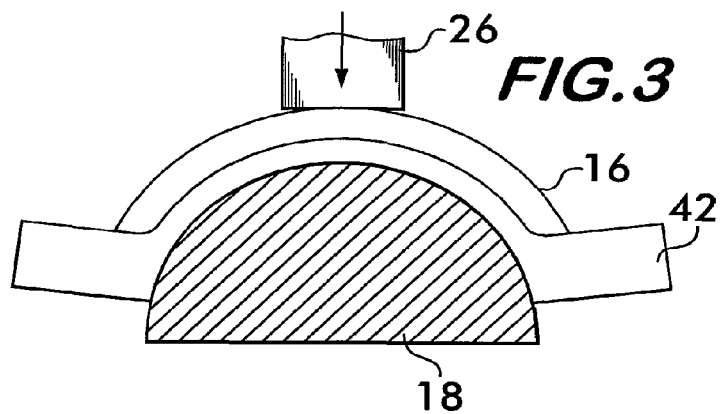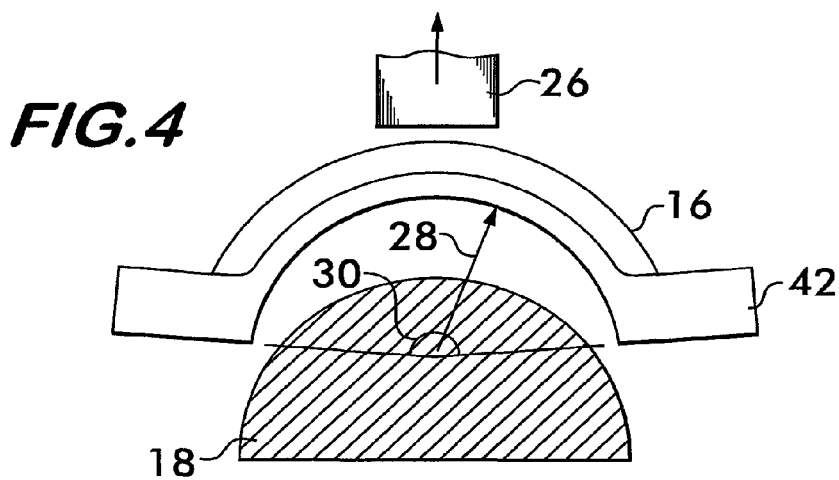

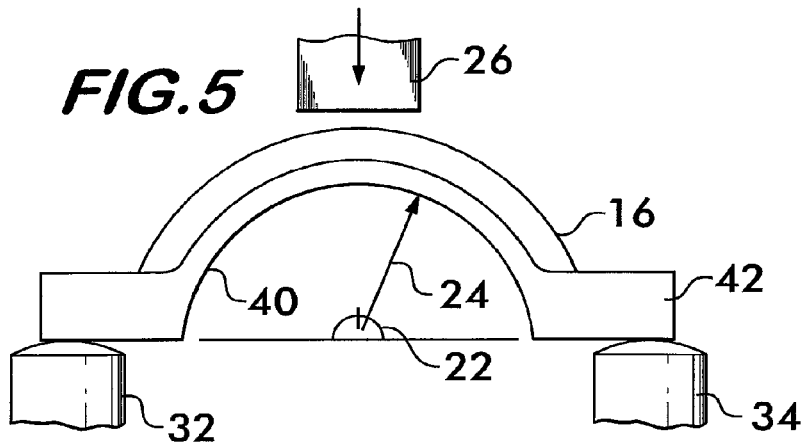
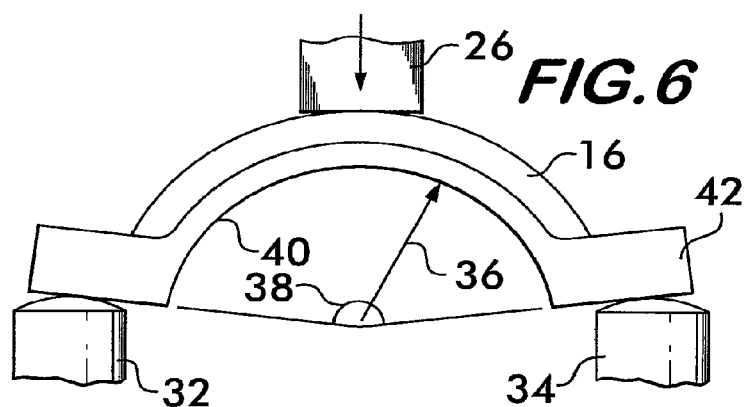
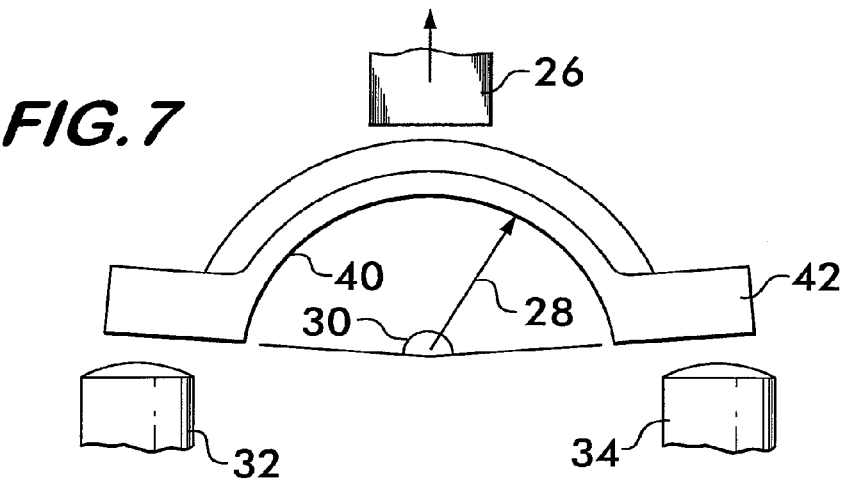

INSTALLATION-READY PIPE COUPLING METHOD OF MANUFACTURE

CROSS-REFERENCE TO RELATED APPLICATION

This application is a divisional application which is based on, and claims priority to U.S. application Ser. No. 12/042,769, filed Mar. 5, 2008, the disclosure of which is incorporated herein by reference.

FIELD OF THE INVENTION

This invention concerns a method of manufacturing mechanical pipe couplings that are ready to be installed without the need for disassembly and reassembly.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees, as well as fluid control components such as valves, reducers, strainers, restrictors, pressure regulators and the like.

Each mechanical coupling segment comprises a housing having arcuate surfaces which project radially inwardly from the housing and engage the outer surfaces of the pipe elements to be joined. Such pipe elements include plain end, grooved, beaded as well as shouldered configurations. Engagement between the arcuate surfaces and the pipe elements provides mechanical restraint to the joint and ensures that the pipe elements remain coupled even under high internal pressure and external forces. The housings define an annular channel between the arcuate surfaces that receives a gasket or seal, typically an elastomeric ring, which engages the ends of each pipe element and cooperates with the segments to provide a fluid-tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly. For couplings used with shouldered or beaded pipe elements, the radii of curvature are sized to engage the outer diameter of the pipe adjacent to the bead or shoulder.

This geometrical relation between the arcuate surfaces of the couplings and the outer surfaces of the pipe elements in prior art couplings results in a time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and frequently stretched to accommodate the pipe elements, an often messy task, as the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, beads or shoulders (when present), the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments) and must totally disassemble and reassemble the coupling. Significant time, effort and expense would be saved if the technician could install a mechanical pipe coupling without first totally disassembling it and then reassembling it, piece-by-piece.

SUMMARY OF THE INVENTION

The invention is drawn to a method of manufacturing an installation-ready pipe coupling for joining pipe elements in end-to-end relation. An installation-ready pipe coupling according to the invention arrives at the work site preassembled and is configured to permit the pipe elements to be inserted without disassembling it.

The method comprises:
  (a) providing a plurality of segments, each of the segments having a pair of contact surfaces adapted to interface with the outer surfaces of the pipe elements, the contact surfaces being in spaced apart side by side relation, the segments subtending an initial angle; and
  (b) deforming each of the segments into a deformed shape subtending a final angle, wherein the final angle is less than the initial angle, the segments maintaining the deformed shape.

In another embodiment, the method comprises:
  (a) providing a plurality of segments, each of the segments having a pair of arcuate contact surfaces adapted to interface with the outer surfaces of the pipe elements, the arcuate contact surfaces being in spaced apart side by side relation, the arcuate contact surfaces having an initial radius of curvature; and
  (b) deforming each of the segments into a deformed shape wherein the arcuate contact surfaces have a final radius of curvature, the final radius of curvature being greater than the initial radius of curvature, the segments maintaining the deformed shape.

In another embodiment the method of manufacturing an installation ready pipe coupling comprises:
  (a) providing a plurality of segments, each of the segments having a pair of contact surfaces adapted to interface with the outer surfaces of the pipe elements, the contact surfaces being in spaced apart side by side relation, the contact surfaces having first and second ends oppositely disposed and positioned at an initial distance apart from one another; and
  (b) deforming each of the segments into a deformed shape wherein the first and second ends of the contact surfaces are positioned at a final distance apart from one another, the final distance being greater than the initial distance, the segments maintaining the deformed shape.

In a particular embodiment, deforming of the segments may comprise:

(a) providing a tool having at least one surface engageable with each of the segments;

(b) engaging each of the segments with the tool; and (c) forcing each of the segments and the tool against one another such that each of the segments deforms to subtend the final angle and/or have the final radius of curvature when the segments are removed from the tool.

In another embodiment of the method, deforming of the segments comprises bending effected by:

(a) supporting each of the segments at two support points in spaced relation lengthwise along each of the segments; and (b) applying a force transversely to each of the segments at a point located between the two support points.

The method further comprises assembling the installation-ready coupling by joining at least two of the segments in end-to-end relation such that the contact surfaces are in facing relation surrounding a center space. The segments may be joined using adjustably tightenable fasteners. Preferably, the segments are maintained in spaced apart relation after joining. A ring shaped seal may be positioned between the segments. The seal has an outer surface which supports the segments and maintains them in the desired spaced apart relation.

Preferably, the initial and final angles and the radius of curvature are measured at the contact surfaces, which are preferably arcuate in shape.

BRIEF DESCRIPTION OF THE DRAWINGS

FIGS. 2-4 and 2A-4A are schematic illustrations depicting an embodiment of a method of manufacturing an installation-ready coupling according to the invention;

FIGS. 5-9 are schematic illustrations depicting another embodiment of a method of manufacturing an installation-ready coupling according to the invention;

DETAILED DESCRIPTION OF THE EMBODIMENTS

Figure 1:
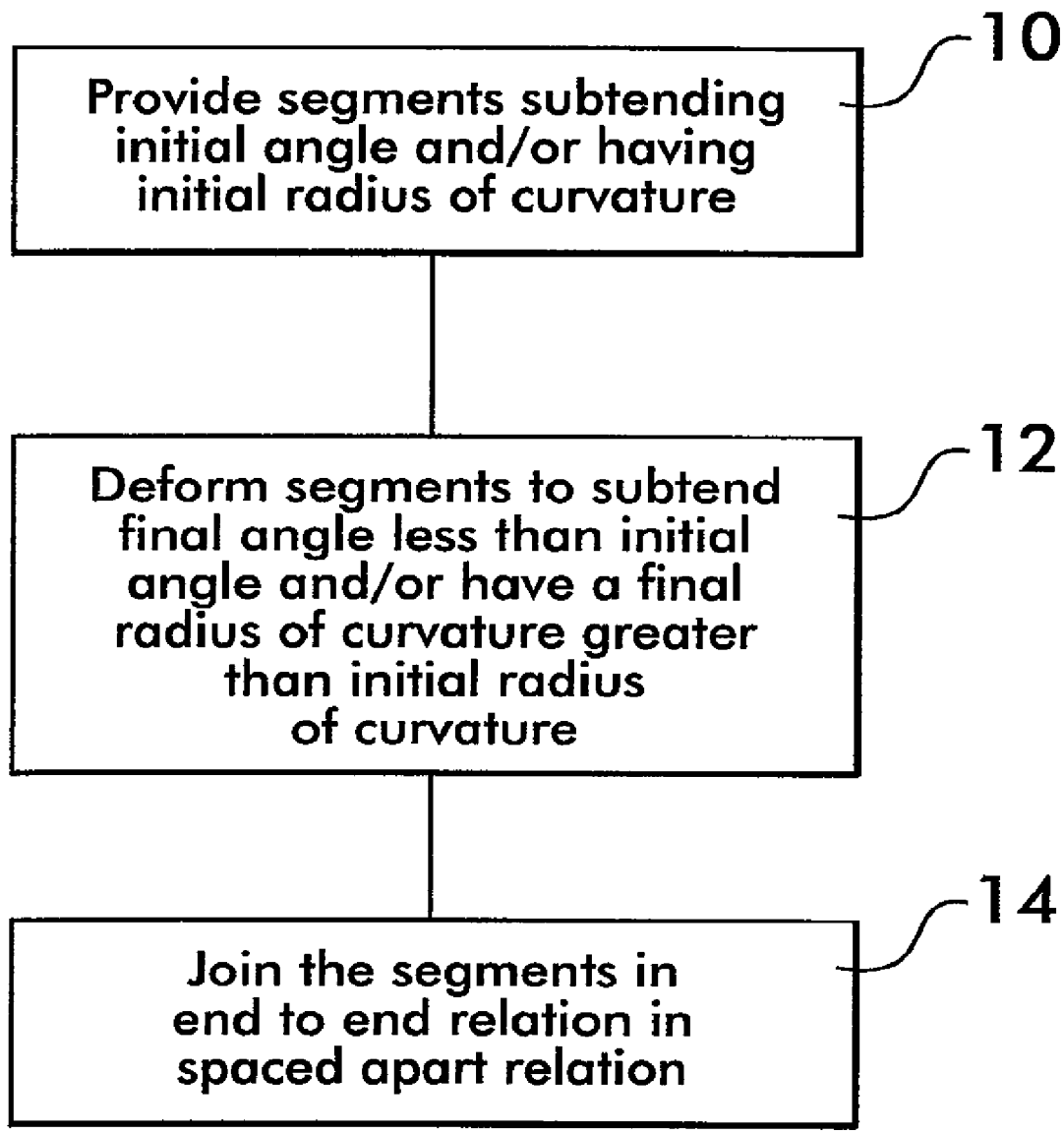
FIG. 1 is a flow chart illustrating a method of manufacturing an installation-ready coupling according to the invention.

FIG. 1 is a flow chart which illustrates a method of manufacturing an installation-ready pipe coupling according to the invention. As seen in box 10, a plurality of segments are provided. The segments are typically cast from ductile iron but could also be formed of other metals such as copper, steel, aluminum malleable iron, stainless steel, copper-nickel alloy as well as plastics such as PVC and CPVC. For the process to be effective, the material from which the segments are formed must be capable of plastically deforming and taking a permanent set into a first deformed shape without cracking or manifesting other modes of failure. The material must also be capable of deforming again without failing, although not necessarily plastically, when in use.

The segments have portions which subtend an initial angle and/or have an initial radius of curvature. As noted in box 12, the segments are deformed so that the subtended angle decreases and/or the radius of curvature increases. The segments are permanently deformed in this manner, meaning that they are stressed beyond their elastic limit so that they take a permanent set and assume the smaller subtended angle and/or the larger radius of curvature.

In box 14, the segments are assembled into couplings by attaching the segments in end-to-end relation using tightenable fasteners. The segments are assembled and maintained in spaced apart relation, for example, by using a seal to support the segments. The spacing between the segments is chosen to allow pipe elements to be inserted between the segments without having to disassemble the coupling. Once the pipe elements are positioned properly within the coupling, the fasteners are tightened. The segments are drawn toward the pipe elements and are engaged with them. The segments deform as a result of the tightening of the fasteners and engagement with the pipe elements, the deformation now increasing the subtended angle and/or decreasing the radius of curvature.

FIGS. 2-4 show one method of deforming a representative segment 16. A tool 18 is provided, the tool having a radius of curvature 20 which is larger than the final radius of curvature desired for the segment 16. The tool radius of curvature 20 may be somewhat larger to compensate for spring-back from the deformed shape, which often occurs when an elastic material is deformed plastically. There is almost always a portion of the material for which the stress induced by the deforming forces does not exceed the elastic limit. This portion of the material does not deform plastically and its elastic properties act to return the segment partially to its original undeformed shape.

In FIG. 2, the segment 16 is shown engaged with the tool 18. In this example the segment subtends an initial angle 22 of about 180°, and it rides high on the tool because its initial radius of curvature 24 is less than the radius of curvature 20 of the tool 18. As shown in FIG. 3, a ram 26 engages the segment 16 and forces it against the tool 18. The ram is preferably actuated hydraulically, although mechanical rams are also feasible. The segment deforms both elastically and plastically as a result and conforms to the shape of the tool. While engaged under force, the segment 16 has the same radius of curvature as the tool. Because it is forced to assume a larger radius of curvature, the subtended angle becomes smaller.

As shown in FIG. 4, the ram 26 is disengaged and the segment 16 is released from the tool 18. The segment has been deformed plastically and takes a permanent set, with a final radius of curvature 28 larger than the initial radius of curvature 24, and a final subtended angle 30 smaller than the initial angle 22. For an initial subtended angle 22 of 180° final subtended angles 30 between about 170° and about 178° are feasible. For practical segments the final radius of curvature may be between about 5% and about 10% greater than the initial radius of curvature.

Figure 2A:
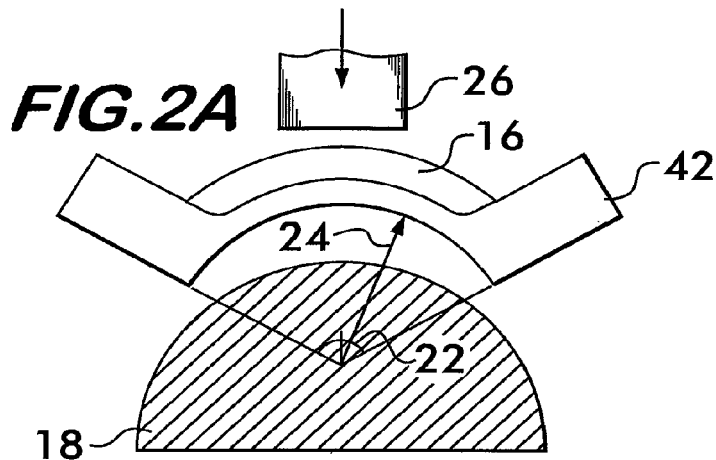
Figure 3A:
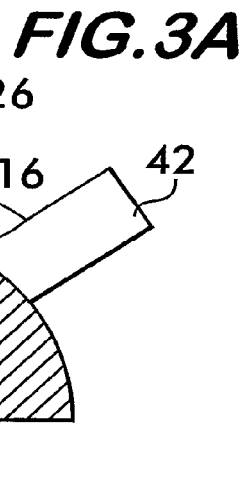
Figure 4A:
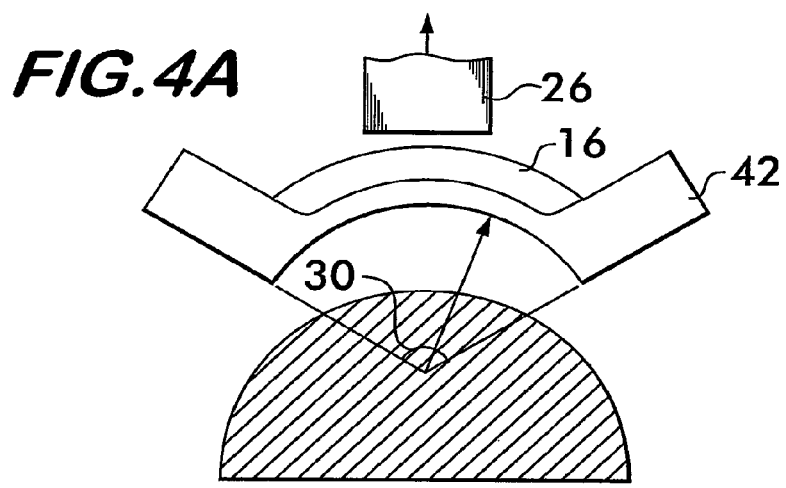

FIGS. 2A, 3A and 4A illustrate the steps as described above for FIGS. 2-4, but for a segment 16 which subtends an initial angle 22 of 120°. A coupling would have three such segments joined end-to-end. The process is essentially the same as for the 180° segment shown in FIGS. 2-4, however, with an initial subtended angle 22 of about 120° the final subtended angle 30 will preferably be between about 112° and about 119°.

FIGS. 5-7 show another method of deforming the segments 16 in the method of making an installation-ready coupling. These figures illustrate a three point bending method. As shown in FIG. 5, the segment 16, having its initial radius of curvature 24 and subtended angle 22, is supported at each end by supports 32 and 34. As shown in FIG. 6, the ram 26 engages the segment somewhere between the supports, preferably midway between them. The ram applies a force transverse to the segment, bending the segment plastically and forcing it to assume a deformed shape having a greater radius of curvature 36 (the "intermediate radius of curvature") and a smaller subtended angle 38 (the "intermediate subtended angle"). Once the proper angular deflection has been achieved, the ram 26 is removed (see FIG. 7) and the segment is removed from supports 32 and 34. The force applied by the ram has resulted in the segment taking a permanent set with a final radius of curvature 28 greater than the initial radius of curvature 24 and a final subtended angle 30 less than the initial subtended angle 22. The final radius of curvature 28 may be less than or equal to the intermediate radius of curvature 36 depending on the amount of spring back in the segment 16. Similarly, the final subtended angle 30 may also be greater than or equal to the intermediate subtended angle 38, again depending on the degree of spring back in the segment.

Figure 8:
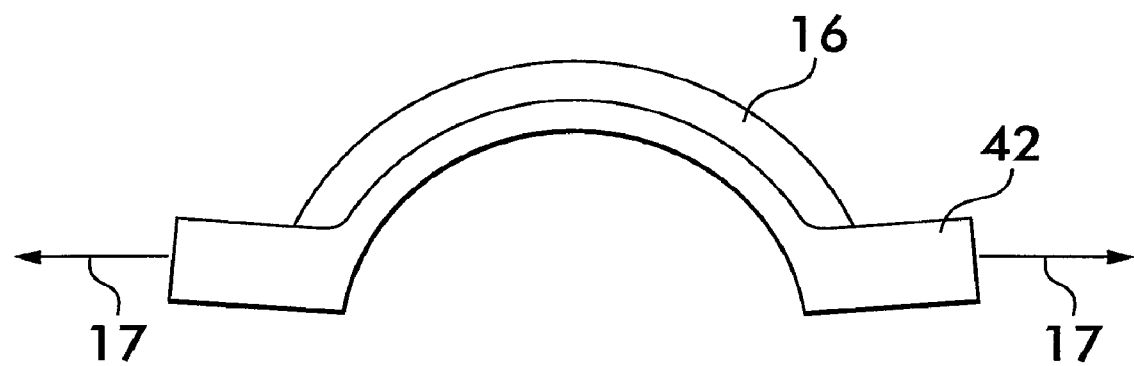
Figure 9:
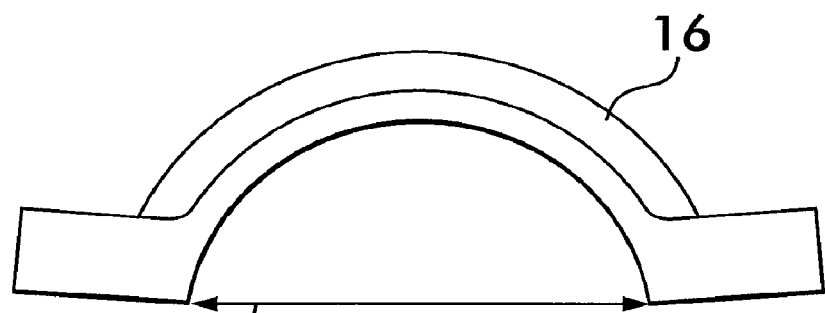

FIG. 8 schematically illustrates another method of deforming a segment 16. In this example, tension forces 17 are applied at opposite ends in opposite directions. Application of such forces may be effected hydraulically using fixtures to engage the lugs 42 which provide convenient attachment points. FIG. 9 illustrates yet another deforming method, whereby an outwardly expanding force 19 is applied between the ends of each segment 16. Again, appropriate fixturing is necessary to effectively apply the deforming force 19.

It is understood that the radii of curvature 24, 28 and 36 may be measured with respect to any convenient point on the segment 16. It is advantageous to measure these radii with respect to concave arcuate surfaces such as 40, which project inwardly and are adapted to contact the outer surfaces of the pipe elements being joined by the coupling as discussed below. Similarly, it is advantageous to measure the subtended angles 22, 30 and 38 with respect to the contact surfaces 40. Alternately, there are lugs 42 at each end of the segments which can be used as the reference datum for the determination of the subtended angles.

Figure 10:
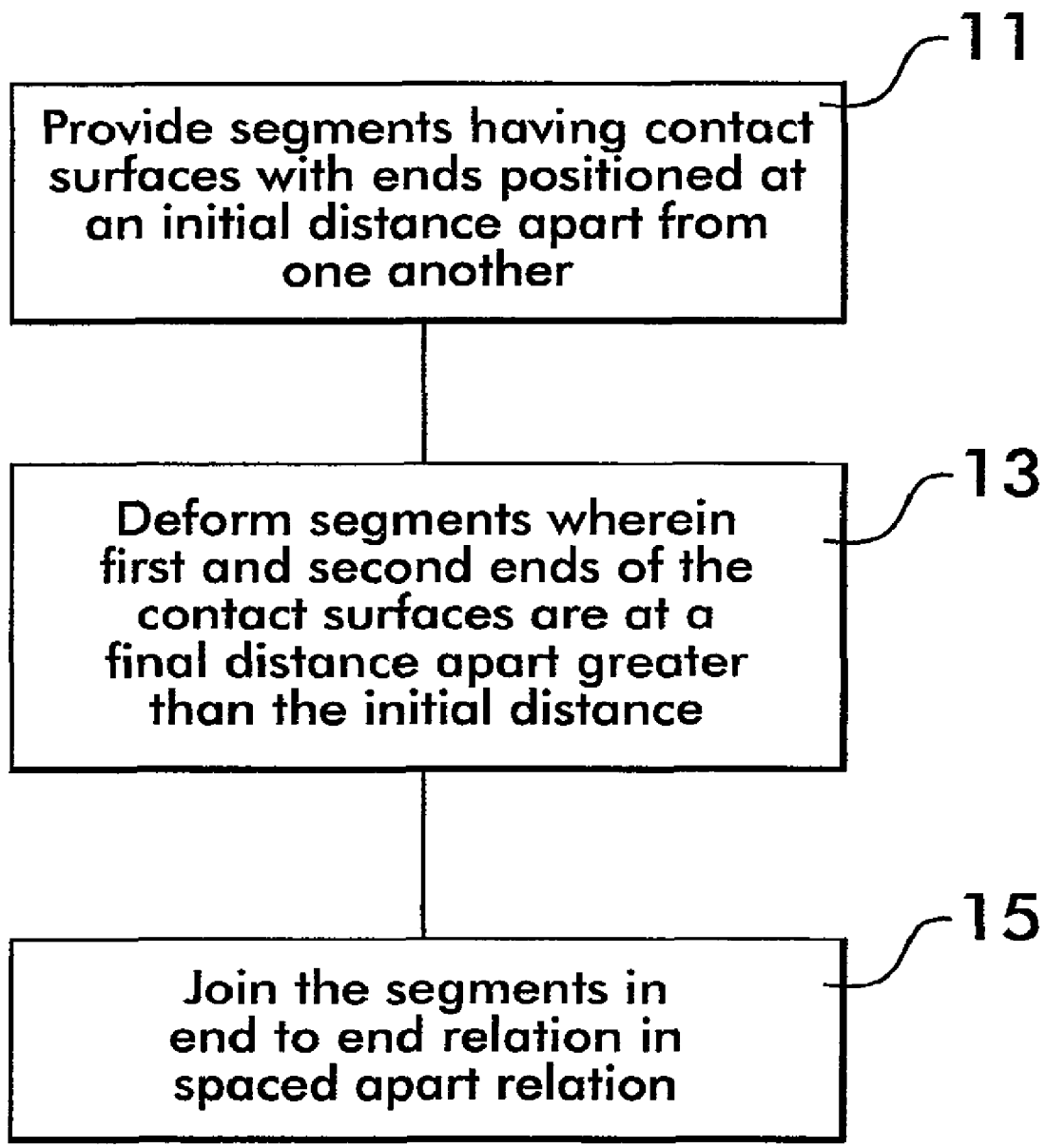
FIG. 10 is a flow chart illustrating another method of manufacturing an installation-ready coupling according to the invention.
Figure 11:
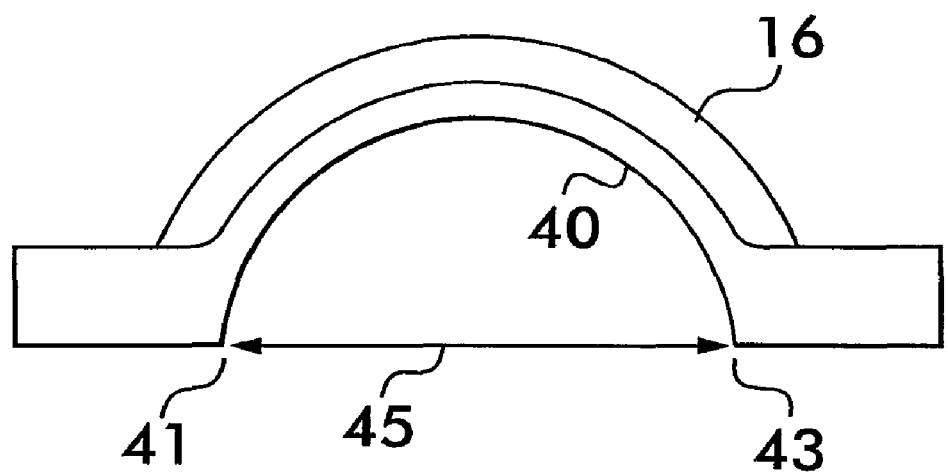
FIGS. 11 and 12 show a pipe coupling segment deformed according to the method described in FIG. 10.
Figure 12:
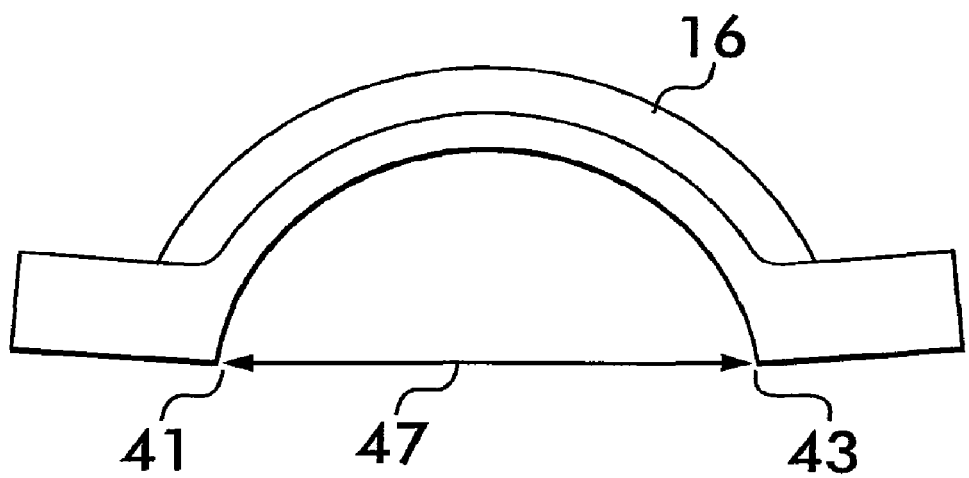

FIG. 10 presents another flow chart which describes an alternate method of manufacturing an installation ready pipe coupling. As described in box 11, segments having contact surfaces with ends positioned at an initial distance apart from one another are provided. An example of such a segment 16 is shown in FIG. 11, wherein contact surfaces 40 have oppositely disposed ends 41 and 43 separated by an initial distance 45. With reference again to FIG. 10, as explained in box 13, the segments are deformed, for example by any of the aforementioned techniques (forced engagement with a tool or three point bending method), so that the ends of the contact surfaces are at a final distance apart from one another, the final distance being greater than the initial distance. This is further illustrated in FIG. 12 wherein segment 16 is shown in a deformed shape with ends 41 and 43 positioned at a final distance 47 which is greater than the initial distance 45 shown in FIG. 11. In a practical embodiment, the final distance 47 is between about 5% to about 10% greater than the initial distance 45. Box 15 in FIG. 10 describes that the segments are joined in end-to-end relation to construct a coupling as explained in detail below.

Figure 13:
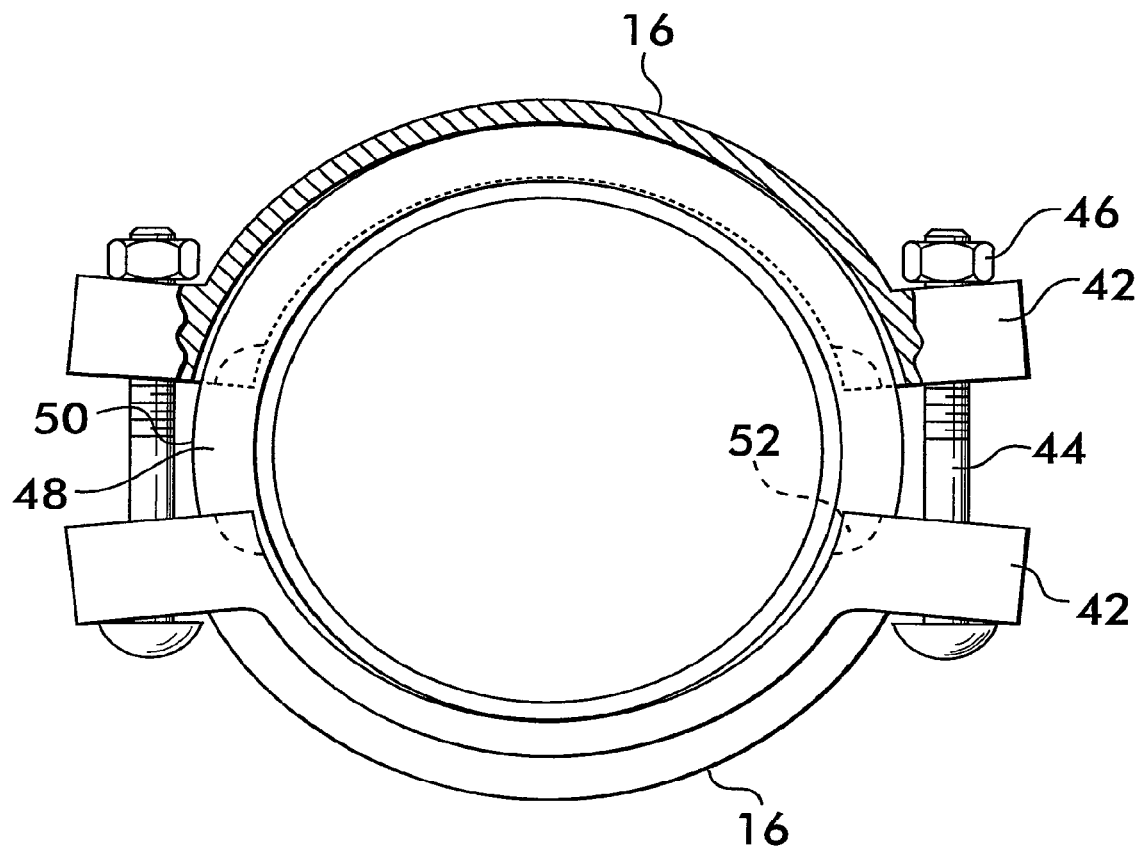
FIG. 13 is a partial sectional end view of an installation-ready coupling.

As shown in FIG. 13, the segments 16, in their deformed shape, are assembled to form a coupling 42. The assembly process comprises joining at least two segments 16 in end-to-end relation and securing them to one another using adjustably tightenable fasteners, such as bolts 44 and nuts 46. The installation-ready aspect of the coupling is afforded by the deformed shape and the fact that the segments are maintained in spaced apart relation to allow pipe elements (for which the coupling is sized) to be inserted between the segments as described below. The segments are preferably maintained in spaced relation by a seal 48 positioned between them. Seal 48 has an outer surface 50 which supports the segments and maintains them in spaced apart relation. Other forms of spacers are also feasible. Notches 52, shown in phantom line, may also be positioned at opposite ends of the segments to provide additional clearance for pipe element insertion. The presence of notches reduces the degree of separation required between the segments and allows for fasteners of reasonable length. U.S. Pat. No. 7,086,131 to Gibb et al describes these various aspects of the coupling and is hereby incorporated by reference herein.

Figure 14:
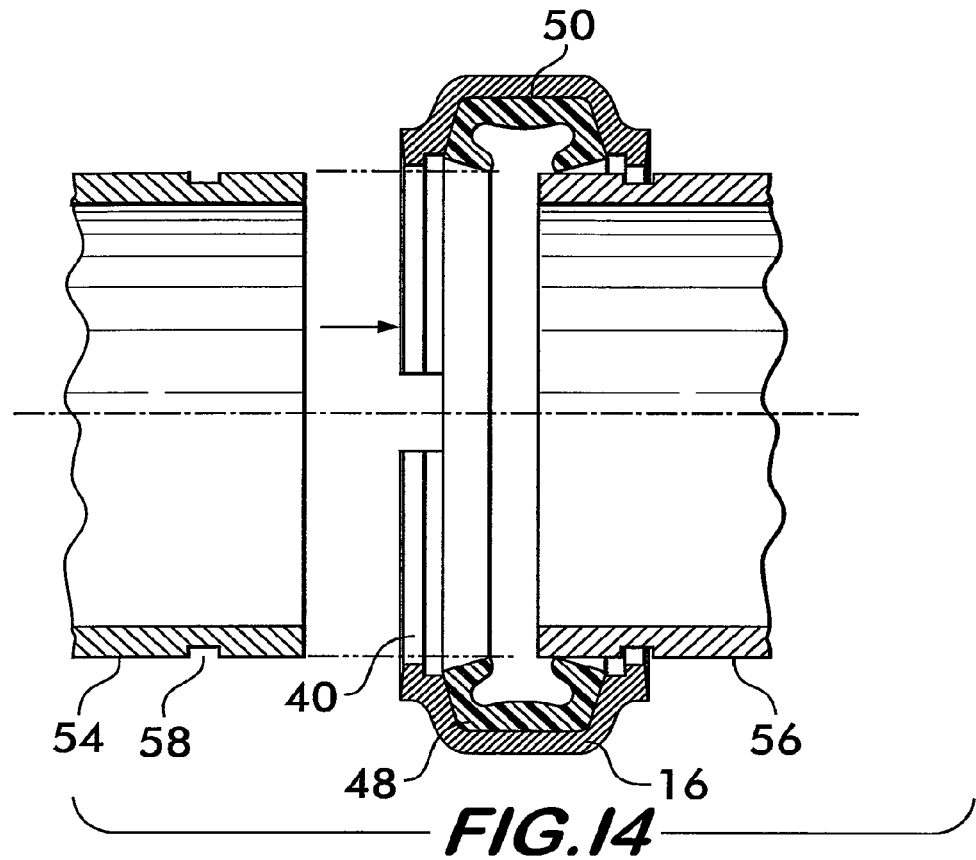
FIGS. 14-17 show assembly of a joint using an installation-ready coupling.
Figure 15:
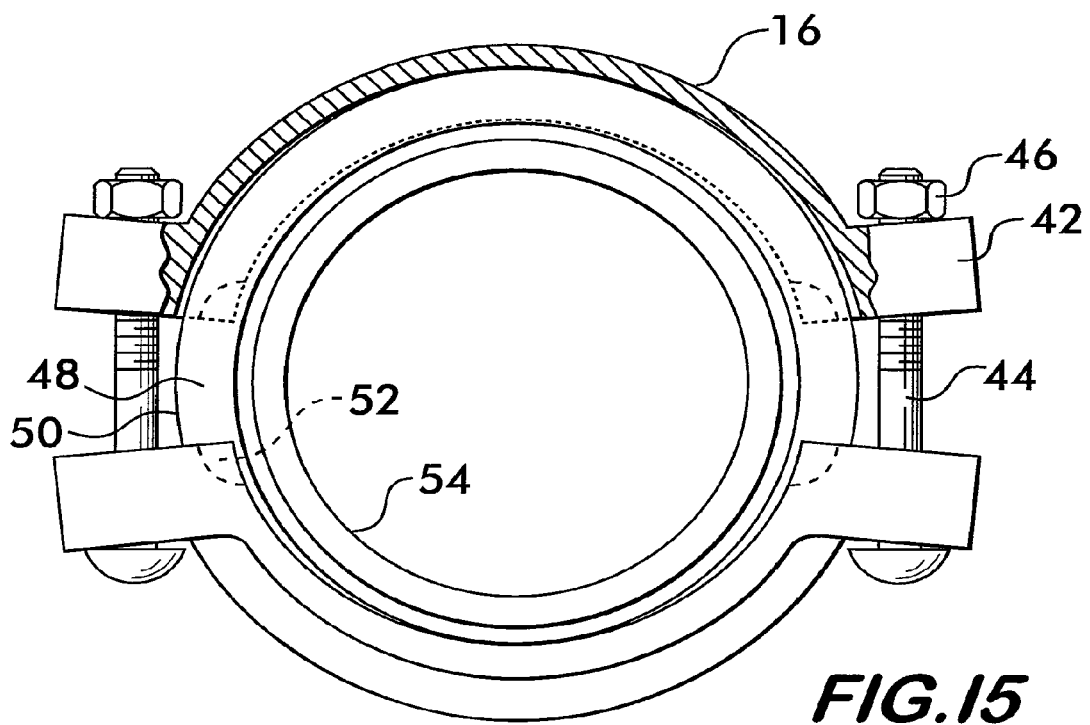
Figure 16:
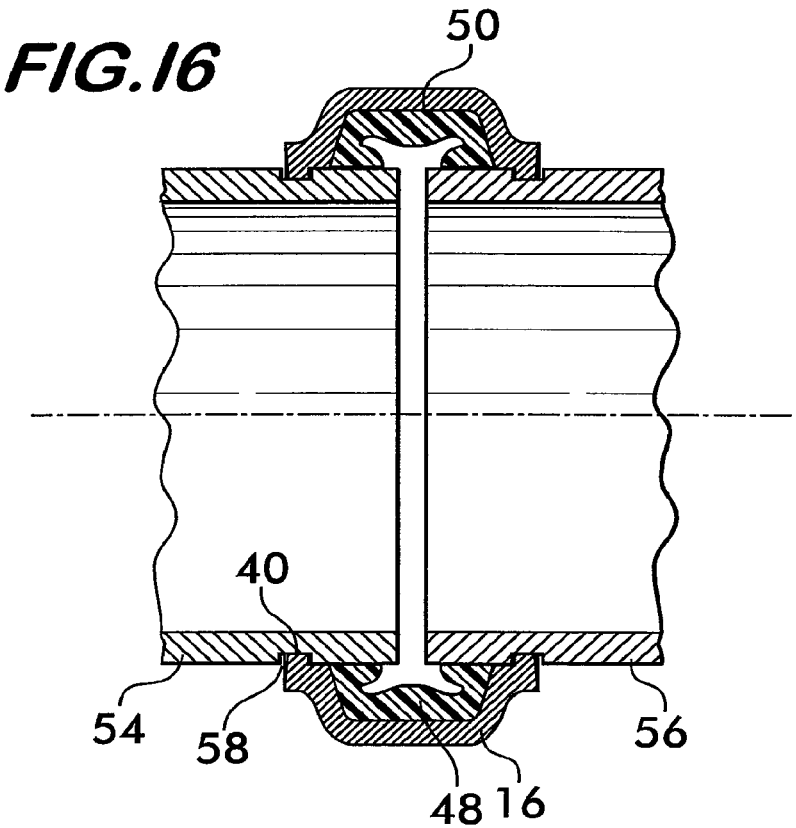
Figure 17:
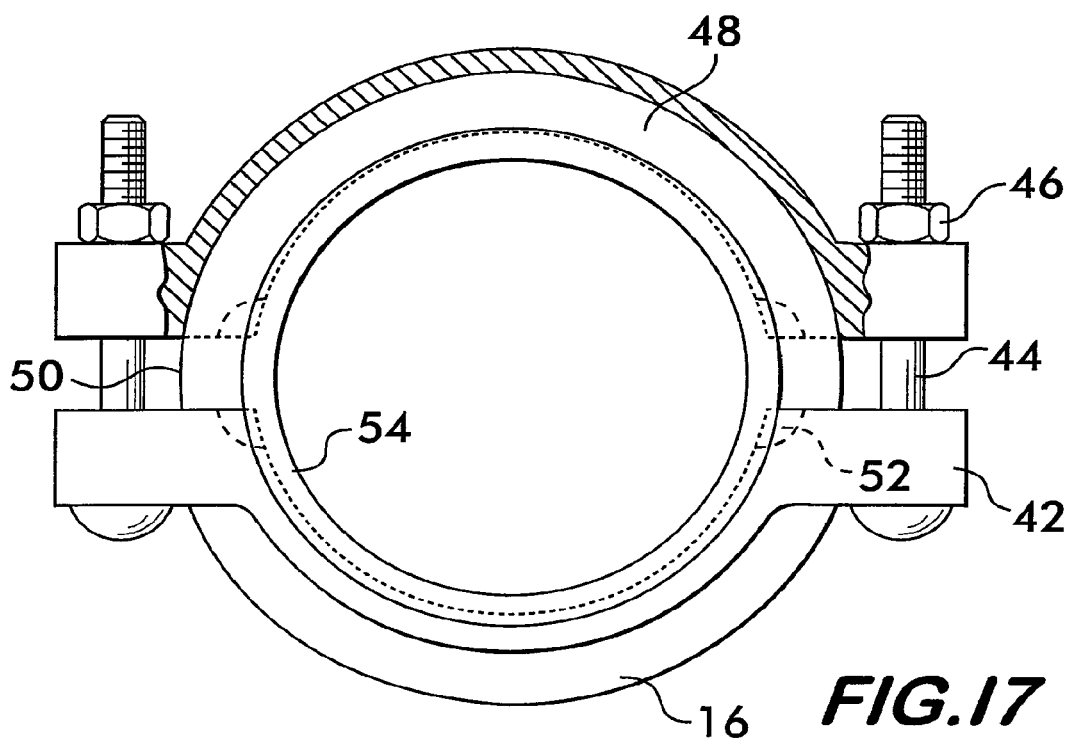

The preassembled, installation-ready coupling is supplied as shown in FIG. 13. In use, as shown in FIGS. 14 and 15, pipe elements 54 and 56 are inserted between the segments 16 without the need for any disassembly thanks to their deformed shape, separation and notches 52 (if present). For the joining of grooved pipe as shown, the contact surfaces 40 of the segments are aligned with grooves 58. As shown in FIGS. 16 and 17, the fasteners (bolts 44 and nuts 46) are tightened, drawing the segments toward one another and into engagement with the pipe elements. Tightening of the fasteners deforms the segments 16 so that the contact surfaces 40 thereon engage the outer surface of the pipe within the grooves 58 substantially over their entire arc length. The force applied by the fasteners is reacted by the pipe elements and the segments are deformed to a smaller radius of curvature and a larger subtended angle as determined by their engagement with the groove surfaces.

In a practical example of an installation ready pipe coupling for use with a pipe having a 2 inch nominal outer diameter (2.375 inch actual outer diameter), the contact surface's final radius of curvature for the deformed shape (before tightening of the fasteners) is about 1.22 inches and the radius when tightened in pad to pad engagement is about 1.12 inches. Alternately, this may be expressed as a function of the distance between the ends of the contact surfaces. For use with the 2 inch nominal outer diameter pipe, in the deformed shape (before tightening), the final distance between the contact surface ends is 2.44 inches. The distance when the fasteners are tightened to bring the segments into pad to pad relation is 2.26 inches.

In another example of an installation ready pipe coupling, for a pipe having a 4 inch nominal outer diameter (4.5 inch actual outer diameter), the contact surface's final radius of curvature for the deformed shape (before tightening of the fasteners) is about 2.36 inches, and the radius when tightened in pad to pad engagement is about 2.16 inches. Alternately, this may be expressed as a function of the distance between the ends of the contact surfaces. For use with the 4 inch nominal outer diameter pipe, in the deformed shape (before tightening), the final distance between the contact surface ends is 4.71 inches. The distance when the fasteners are tightened to bring the segments into pad to pad relation is 4.35 inches.

Installation-ready pipe couplings manufactured according to the methods described herein provide a robust, rigid, fluid-tight joint while reducing the time and effort required for installation.

What is claimed is:

1. A method of manufacturing an installation ready pipe coupling for joining pipe elements in end-to-end relation, said method comprising:
   providing a plurality of segments, each of said segments having a pair of arcuate contact surfaces adapted to interface with the outer surfaces of said pipe elements, said arcuate contact surfaces being in spaced apart side by side relation, said arcuate contact surfaces having an initial radius of curvature; and deforming each of said segments into a deformed shape wherein said arcuate contact surfaces have a final radius of curvature, said final radius of curvature being greater than said initial radius of curvature, said segments maintaining said deformed shape.

2. A method according to claim 1, wherein said final radius of curvature is between about 5% and about 10% greater than said initial radius of curvature.

3. A method of manufacturing an installation ready pipe coupling for joining pipe elements in end-to-end relation, said method comprising:

providing a plurality of segments, each of said segments having a pair of contact surfaces adapted to interface with the outer surfaces of said pipe elements, said contact surfaces being in spaced apart side by side relation, said contact surfaces having first and second ends oppositely disposed and positioned at an initial distance apart from one another; and deforming each of said segments into a deformed shape wherein said first and second ends of said contact surfaces are positioned at a final distance apart from one another, said final distance being greater than said initial distance, said segments maintaining said deformed shape.

4. A method according to claim 3, wherein said final distance is between about 5% and about 10% greater than said initial distance.

5. A method according to claim 3, wherein said deforming comprises:

providing a tool having at least one surface engageable with each of said segments;

engaging each of said segments with said tool; and forcing each of said segments and said tool against one another such that each of said segments deforms to position said first and second ends of said contact surfaces at said final distance apart.

6. A method according to claim 3, wherein said deforming comprises:

supporting each of said segments at two support points in spaced relation lengthwise along each of said segments; and applying a force transversely to each of said segments at a point located between said two support points.

7. A method according to claim 3, wherein said deforming comprises applying tension forces to opposite ends of said segments.

8. A method according to claim 3, wherein said deforming comprises applying an outwardly expanding force between ends of each of said segments.

9. A method according to claim 3, further comprising joining said segments in end-to-end relation such that said contact surfaces are in facing relation surrounding a central space.

10. A method according to claim 9, further comprising joining said segments using adjustably tightenable fasteners.

11. A method according to claim 9, further comprising maintaining said segments in spaced apart relation after joining said segments.

12. A method according to claim 11, further comprising positioning a ring shaped seal between said segments, said seal having an outer surface supporting said segments and maintaining them in said spaced apart relation.

* * * * *